(12) United States Patent
Eller et al.

(10) Patent No.: US 8,405,007 B2
(45) Date of Patent: Mar. 26, 2013

(54) DEVICE FOR PRODUCING A TEMPERATURE GRADIENT

(75) Inventors: Martin Eller, Ludwigsburg (DE); Steffen Geiger, Asperg (DE); Erich Berdel, Asperg (DE); Nicolaus Wulff, Ludwigsburg (DE); Bernd Last, Reutlingen (DE); Gerald Fromm, Wain (DE); Volker Brichzin, Ludwigsburg (DE)

(73) Assignee: BERU Aktiengesellschaft, Ludwigsburg (DE)

( * ) Notice: Subject to any disclaimer, the term of this patent is extended or adjusted under 35 U.S.C. 154(b) by 646 days.

(21) Appl. No.: 12/448,985

(22) PCT Filed: Jan. 15, 2008

(86) PCT No.: PCT/DE2008/000053
§ 371 (c)(1),
(2), (4) Date: Jan. 21, 2010

(87) PCT Pub. No.: WO2008/086779
PCT Pub. Date: Jul. 24, 2008

(65) Prior Publication Data
US 2010/0126983 A1 May 27, 2010

(30) Foreign Application Priority Data
Jan. 19, 2007 (DE) .......................... 10 2007 003 794

(51) Int. Cl.
*H05B 3/06* (2006.01)
(52) U.S. Cl. .............. 219/520; 219/206; 219/522
(58) Field of Classification Search .............. 219/206, 219/226, 267, 520, 522, 523, 534, 536, 537, 219/202, 489, 482, 546, 548, 549
See application file for complete search history.

(56) References Cited

U.S. PATENT DOCUMENTS

| 1,928,142 | A | * | 9/1933 | Trent et al. ................. 338/58 |
| 4,505,107 | A | * | 3/1985 | Yamaguchi et al. ........ 60/303 |
| 5,992,399 | A | | 11/1999 | Anderson et al. |
| 6,040,557 | A | * | 3/2000 | Prust et al. ................. 219/206 |
| 6,353,707 | B1 | * | 3/2002 | Loktev et al. .............. 392/435 |
| 6,651,632 | B2 | * | 11/2003 | Thimmesch et al. ....... 123/549 |
| 7,084,374 | B2 | | 8/2006 | Geiger et al. |
| 7,472,695 | B2 | * | 1/2009 | Prust et al. ................. 123/549 |
| 2002/0096155 | A1 | | 7/2002 | Thimmesch et al. |
| 2004/0069762 | A1 | * | 4/2004 | Yoneyama et al. ........ 219/217 |
| 2004/0182848 | A1 | * | 9/2004 | Stabile ....................... 219/213 |

FOREIGN PATENT DOCUMENTS
EP 1 571 325 A1 9/2005
* cited by examiner

*Primary Examiner* — Cuong Q Nguyen
*Assistant Examiner* — Yosef Gebreyesus

(57) ABSTRACT

Device for creating a temperature gradient, especially in gaseous media, comprising at least one ohmic resistor and at least two non-conducting insulators and at least one casing and at least one elastic element positioned between the non-conducting insulator and the casing.

7 Claims, 12 Drawing Sheets

DEVICE FOR PRODUCING A TEMPERATURE GRADIENT

This invention concerns a device for creating a temperature gradient, especially in gaseous media. The device comprises at least one ohmic resistor, which can be designed meander-shaped, at least two non-conducting insulators, at least one casing and at least one elastic element.

Devices for creating a temperature gradient are known. In devices according to prior art, wear often occurs in the device, which can affect the functioning or result in failure of the device. Such wear arises particularly from relative motions between the various parts of the device, which primarily occur when the device is used under non-static conditions.

SUMMARY OF THE INVENTION

The object the invention is based on is therefore to create a device of the type mentioned at the outset, which can be reliably operated and is also easy to assemble.

With prior art it has been found that degrees of spatial freedom of the ohmic resistor result in abrasion and wear in the device, and impairment of function or failure may occur. Such occurrences are to be avoided through the inventive structure of the device. With a meander-type design of the ohmic resistor, this is achieved, for example, by the fact that before being installed in the device, it has a shape stretched over angles $\alpha$ and $\beta$, thus upon installation in the device a pretension force is created, substantially limiting the room for motion by the various parts and minimizing wear.

Another object of the invention is enabling simplified and reliable manufacture and/or assembly of the device invented. According to the invention, this task is solved in that special assembly aid elements are provided on the various parts of the device.

The inventive assembly aid elements, which may be provided both on the at least one casing and on the at least two non-conducting insulators, may at the same time be designed such that the degrees of freedom of the various parts of the device are restricted, thus further minimizing and preventing wear.

BRIEF DESCRIPTION OF THE DRAWINGS

In the following, especially advantageous design forms are described as well as further developments of the inventive device using the attached drawings.

DETAILED DESCRIPTION

Figure 1:
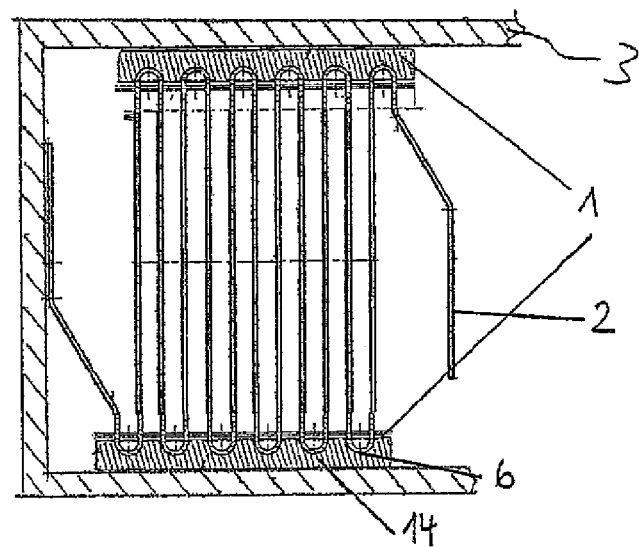
FIG. 1 shows a heater for preheating air.
Figure 19:
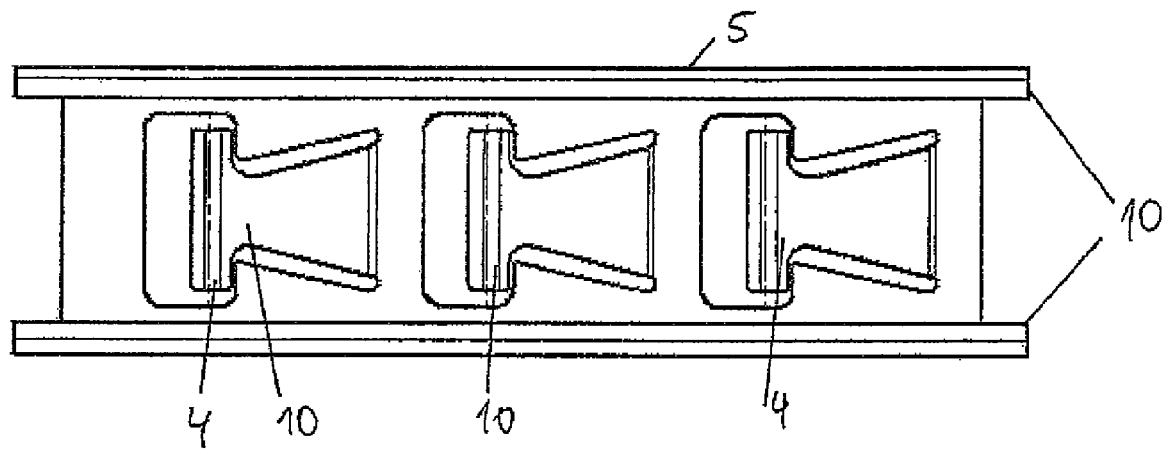
FIGS. 19-20 shows casings.
Figure 20:
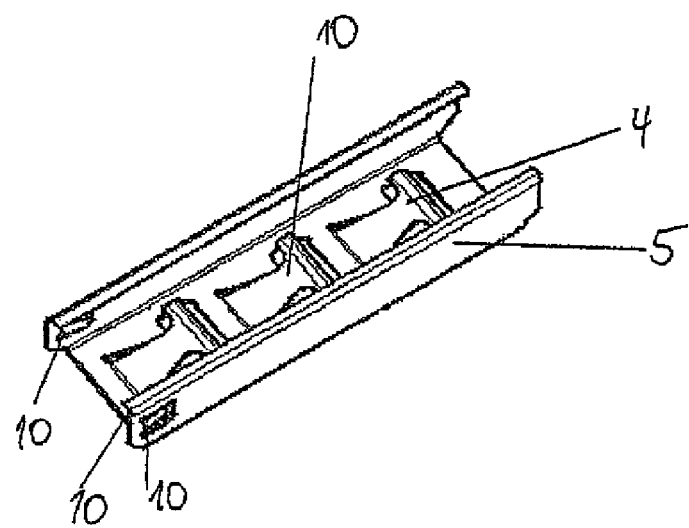

The heater shown in FIG. 1, especially for air preheating, especially in the intake tract of engines, has a casing 3. The heating band 2 of the heater is arranged in a meander shape in two insulators 1 in a fashion to secure it against shifting such that the meander turning point of the heating band 2 contacts the retainer 14 for the insulator 1. Such a heater is produced by one or more insulators, as shown for example, in FIGS. 17 and 18, being pushed from the side into the casing 5, which is shown in FIGS. 19 and 20, such that the insulator/s 1 are prevented from falling out inadvertently by the assembly aid elements (sideways and upwards) in conjunction with the elastic elements 4, which in FIGS. 19 and 20 on the bottom side of the casing are identical to the assembly aid elements. In an alternative design, the insulators 1 from FIGS. 3, 5, 17 & 18 are put into a casing 5 from the top side of the casing 5 into the casing 5 or clicked into position with the help of the corresponding aid elements 10 & 11, as shown in FIGS. 9, 10, 11, 12, 13, 14, 15 and 16, doing so after one or more springs 4 have been put in or mounted at the place provided for them, e.g. aid element 10. An ohmic resistor 2 bent in a meander shape is then inserted into two insulator elements created in such manner along with casing 5 for them, as can be seen in FIGS. 1, 2, 4, 7 and 8. This unit, consisting of ohmic resistor 2 and insulator 1 along with casing 5 is inserted into a casing 3, and then connected to the electrical installation not shown.

Figure 2:
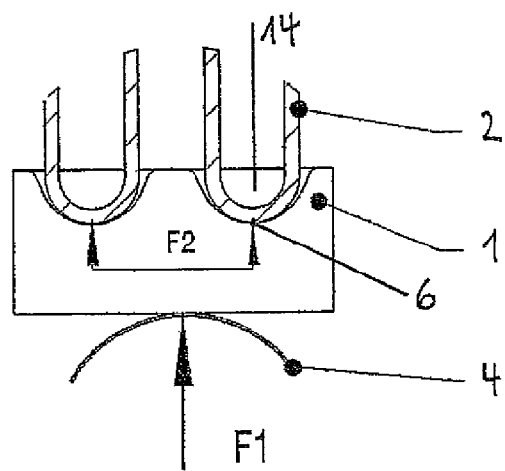
FIGS. 2-5 shows a non-conducting insulator.
Figure 3:
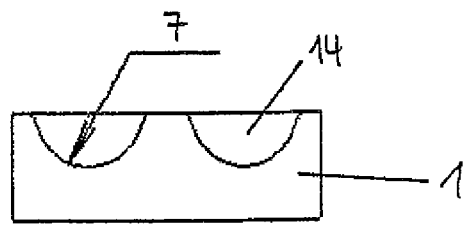

FIG. 2 shows a non-conducting insulator 1. The insulator 1 has two retainers 14, which receive the meander turning points 6 of the ohmic conductor 2. The retainer 14 is shaped approximately semi-circularly. The component forces F2, which result from the force F1 of the elastic element act on the bearing surfaces in the radius 7, as shown in FIG. 3, between heating band 2 and insulator 1. The heating band 2 rests where the arrows F2 are on the ceramic of the insulator 1 in the retainer 14.

Figure 4:
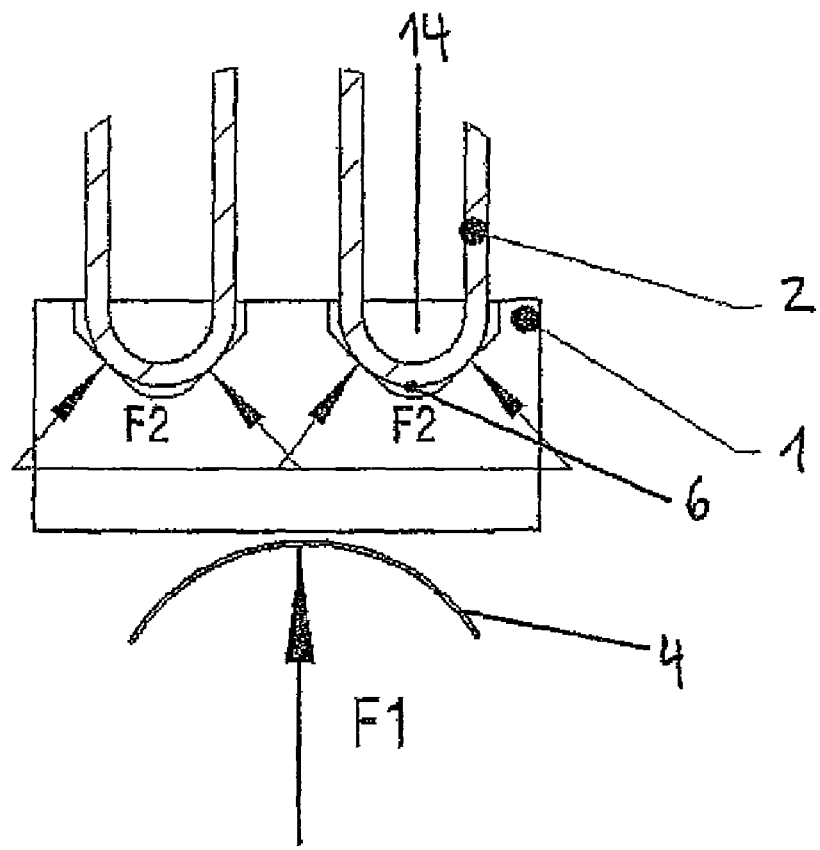
Figure 8:
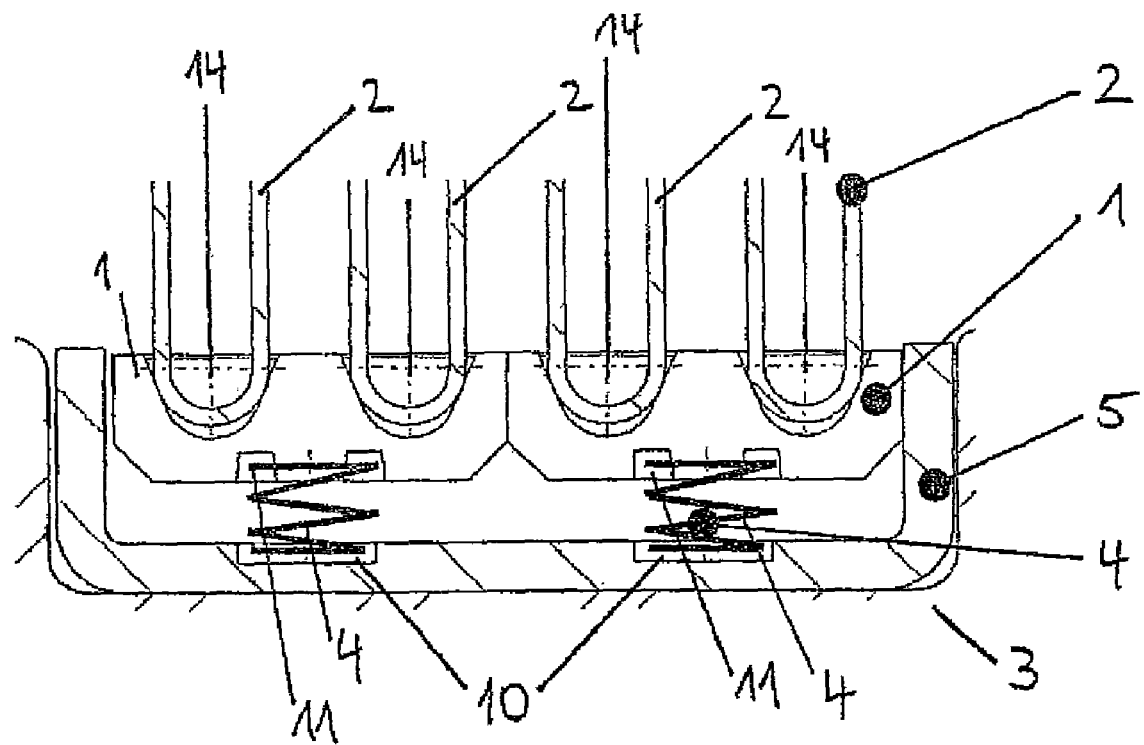
FIGS. 8-12 shows two non-conducting insulators.

A non-conducting insulator 1 is shown in FIG. 3. The insulator 1 has two retainers 14, which assume the meander turning points 6 of the ohmic conductor 2, as shown in FIGS. 2, 4 and 8. The retainer 14 is designed essentially semi-circularly.

FIG. 4 shows a non-conducting insulator 1. The insulator 1 has two retainers 14, which receive the meander turning points 6 of the ohmic conductor 2. The retainer 14 has two slants, which form the angle $\gamma$. The angle $\gamma$ should preferably be within a range of 30° and 90°. The component forces F2, which result from the force F1 of the elastic element, 4 act on the slants. In the region of arrows F2, the heating band 2 visibly contacts the ceramic of the insulator 1 twice in the retainer 14 on the sides of the angle $\gamma$.

Figure 5:
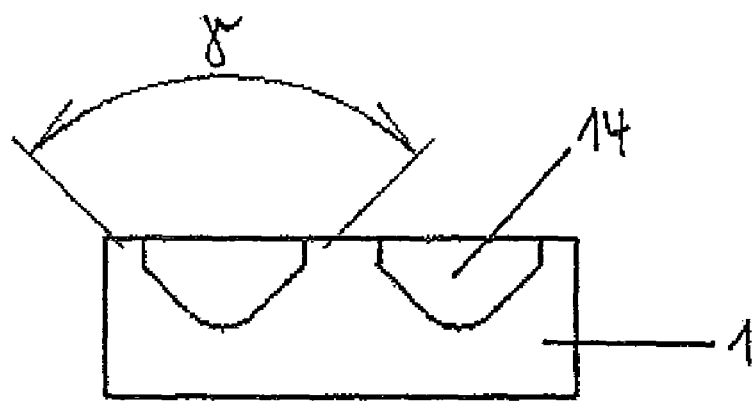
Figure 18:
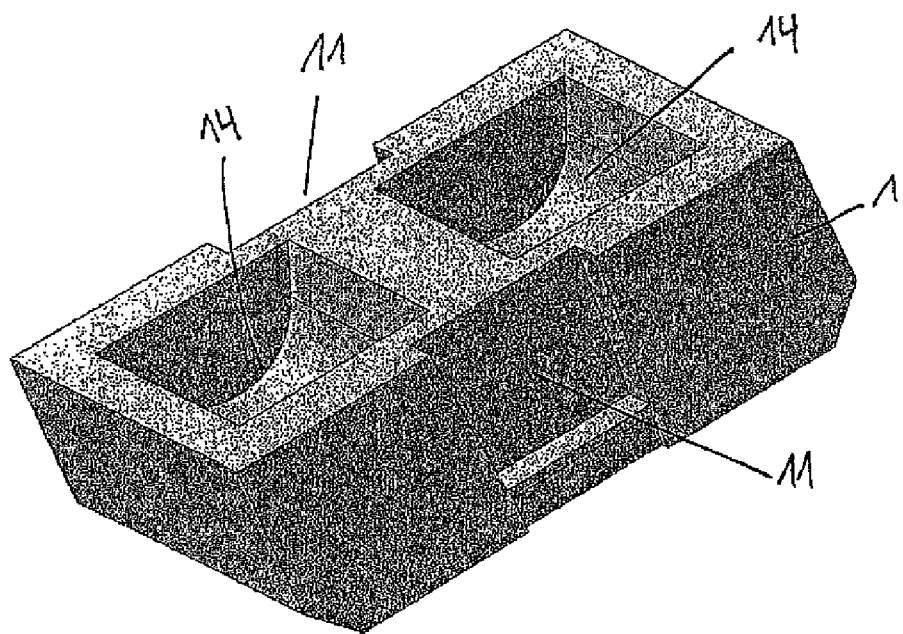

In FIG. 5 a non-conducting insulator 1 is shown, which, as can be seen in FIG. 18, has an assembly aid element 11 on its front side. On its rear side there is also an assembly aid element 11. The assembly aid elements 11 correspond to the assembly aid elements 10 for the insulator casing, as is shown in FIGS. 10 to 16. The insulator 1 has two retainers 14, which receive the meander turning points 6 of the ohmic conductor 2, as shown in FIGS. 2, 4 and 8. The retainer 14 has two slants, which form the angle $\gamma$. The angle $\gamma$ should preferably be within a range of 30° and 90°.

Figure 6:
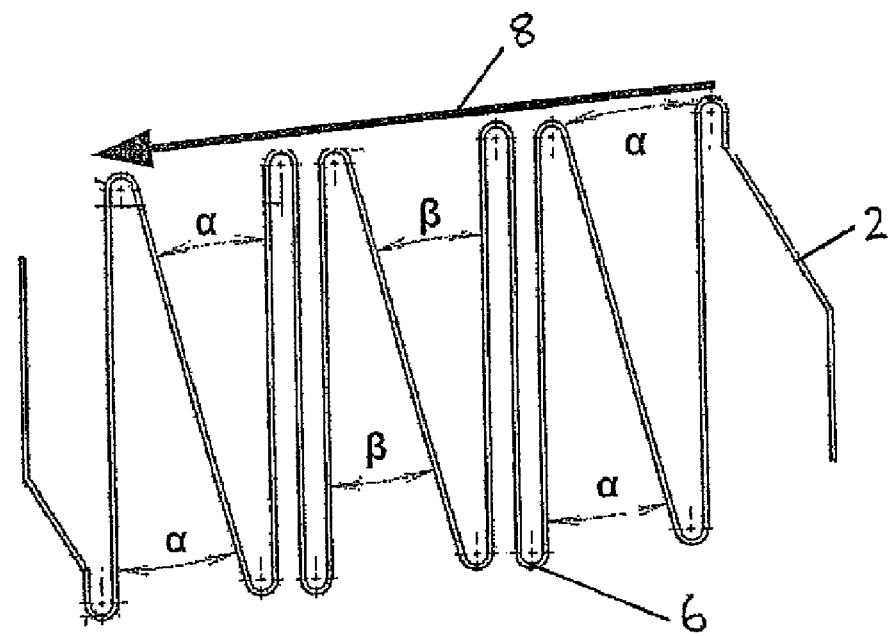
FIG. 6 shows an ohmic resistor.

An ohmic resistor 2 is shown in FIG. 6, which coming from a flat steel element is shaped or bent in a meander form. The defined arrangement of angles $\alpha$ and $\beta$ with the heating band 2 then compressed in the direction 8 drawn in results in pretension created in the heating band 2 as well as the jamming desired in the insulator 1, which is indicated schematically by the horizontal force arrows and which can be seen advantageously in the assembled state in FIG. 1.

Figure 7:
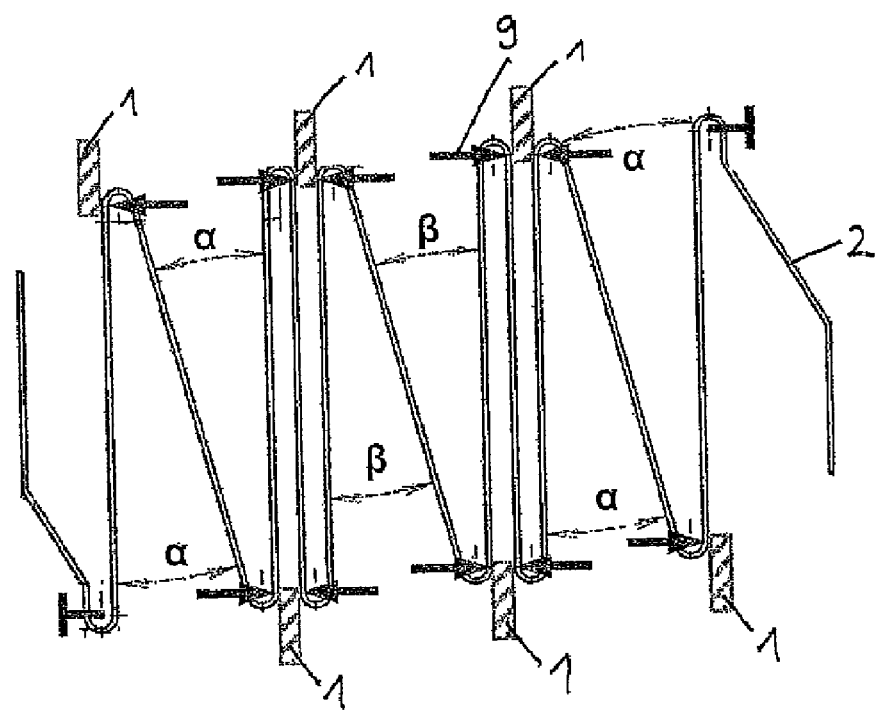
FIG. 7 shows a portrayal of the forces on the ohmic resistor.

FIG. 7 shows a portrayal of the forces on the ohmic resistor 2 put in under tension, which is used here as a so-called heating band.

FIG. 8 shows two non-conducting insulators 1. Two assembly aid elements 11 are positioned on the bottom sides of the insulators 1, which is shown as a sectional drawing in FIG. 8.

The spring 4 is positioned between the assembly aid element 10, which may be designed either in male or female fashion, and the assembly aid element 11. The assembly aid elements 11 correspond to the assembly aid elements 10 for the insulator casing 5. The insulator 1 has two retainers 14, which receive the meander turning points 6 of the ohmic conductor 2.

Figure 9:
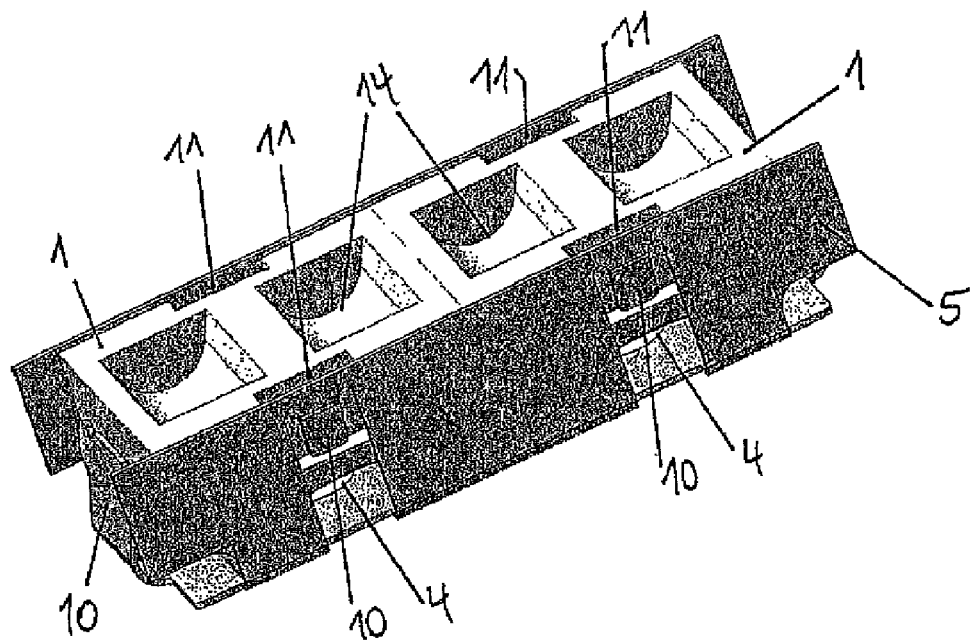

FIG. 9 portrays two non-conducting insulators 1, each of which has an assembly aid element 11 on their front side. On their rear sides there is also one assembly aid element 11 each. The spring 4 is positioned between the insulators 1 and the casing 5. The assembly aid elements 11 correspond to the assembly aid elements 10 for the insulator casing 5.

The insulator 1 has two retainers 14, which receive the meander turning points 6 of the ohmic conductor 2, as shown in FIGS. 2, 4 and 8.

Figure 10:
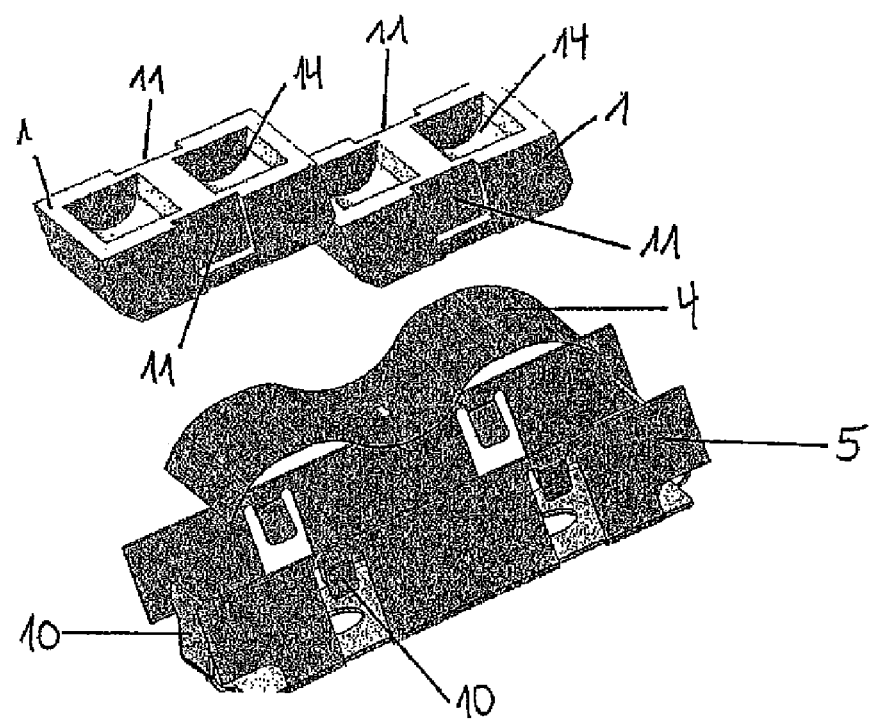

In FIG. 10 two non-conducting insulators 1 are shown, which have one assembly aid element 11 each on their front sides. On their rear sides there is also one assembly aid element 11 each. The spring 4, which in this design example is executed as a spring, is positioned between the insulators 1 and the casing 5. The assembly aid elements 11 correspond to the assembly aid elements 10 for the insulator casing 5. The insulator 1 has two retainers 14, which receive the meander turning points 6 of the ohmic conductor 2, as shown in FIGS. 2, 4 and 8.

Figure 11:
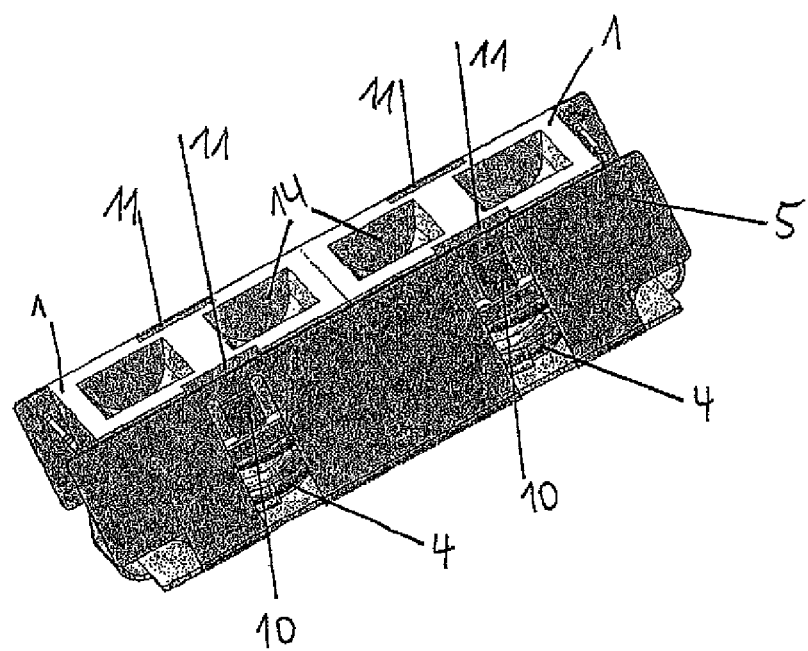

In FIG. 11 two non-conducting insulators 1 are shown, which have one assembly aid element 1 each on their front sides. On their rear sides there is also one assembly aid element 11 each. Two more assembly aid elements 11 are positioned on the bottom sides of the insulators 1, and thus not visible here, which, however, is shown as a sectional drawing in FIG. 8. The spring 4 is positioned between the assembly aid element 10, which may be designed either in male or female fashion, and the assembly aid element 11. The assembly aid elements 11 correspond to the assembly aid elements 10 of the insulator casing 5. The insulator 1 has two retainers 14, which receive the meander turning points 6 of the ohmic conductor 2, as shown in FIGS. 2, 4 and 8.

Figure 12:
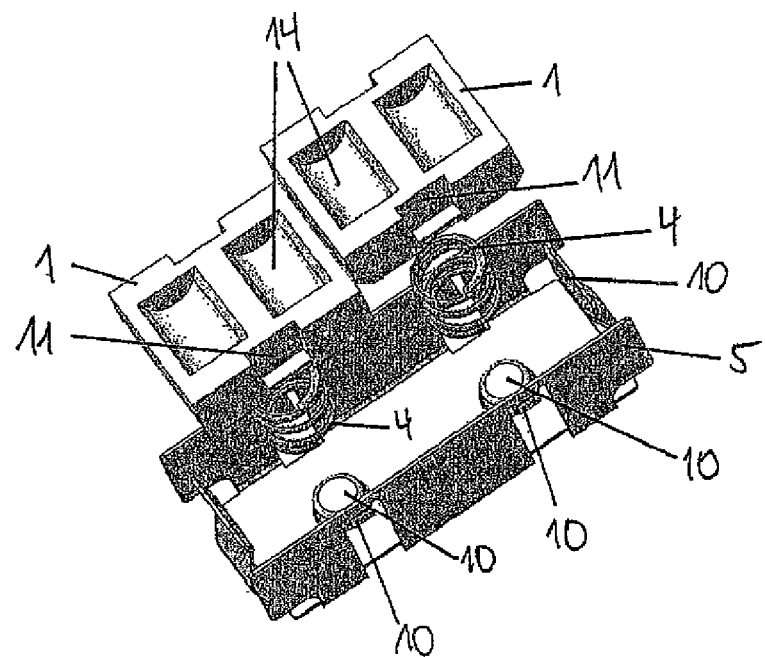

In FIG. 12 two non-conducting insulators 1 are shown, which have one assembly aid element 11 each on their front sides. On their rear sides there is also one assembly aid element 11 each. Two more assembly aid elements 11 are positioned on the bottom sides of the insulators 1, and thus not visible here, which, however, is shown as a sectional drawing in FIG. 8. The spring 4 is positioned between the assembly aid element 10 and the assembly aid element 11. The assembly aid elements 11 correspond to the assembly aid elements 10 of the insulator casing 5. The insulator 1 has two retainers 14, which receive the meander turning points 6 of the ohmic conductor 2, as shown in FIGS. 2, 4 and 8.

Figure 13:
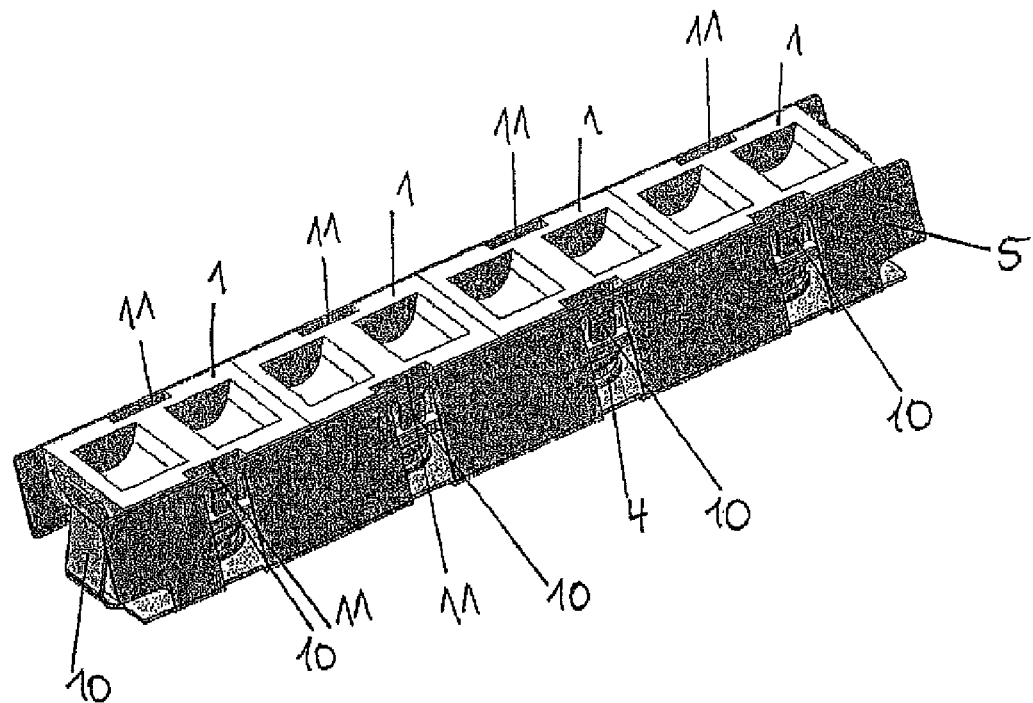
FIG. 13 shows four non-conducting insulators.

FIG. 13 shows four non-conducting insulators 1, each of which has one assembly aid element 11 on their front sides. On their rear sides there is also one assembly aid element 11 each. Four more assembly aid elements 11 are positioned on the bottom sides of the insulators 1, and thus not visible here, which, however, is shown as a sectional drawing in FIG. 8. The spring 4 is positioned between the assembly aid element 10, which may be designed either in male or female fashion, and the assembly aid element 11. The assembly aid elements 11 correspond to the assembly aid elements 10 of the insulator casing 5. The insulator 1 has two retainers 14, which receive the meander turning points 6 of the ohmic conductor 2, as shown in FIGS. 2, 4 and 8. On the short sides of the casing 5 there is one assembly aid element 10 each, which fix the insulators 1 in position elastically.

Figure 14:
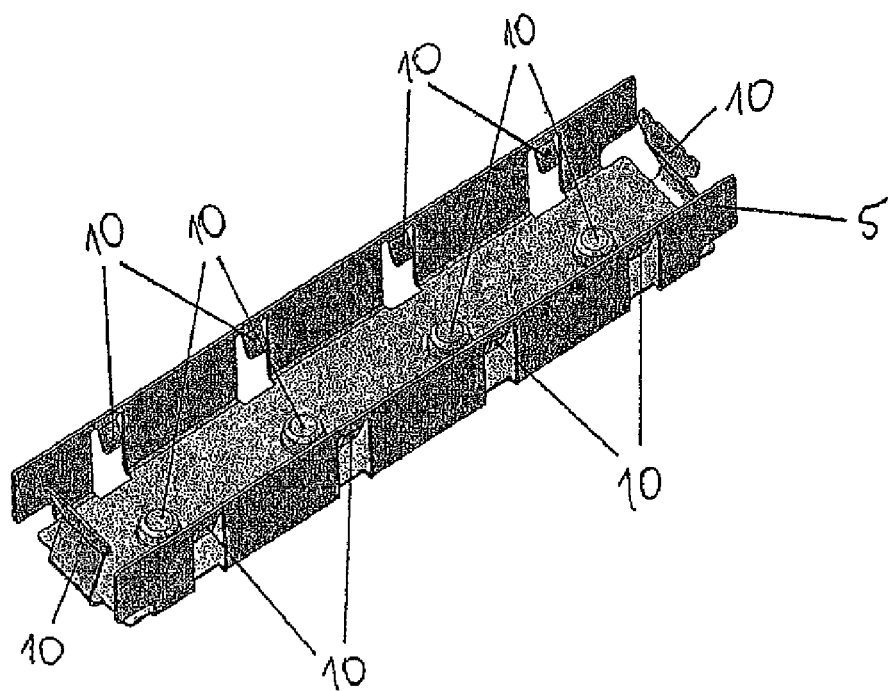
FIG. 14 shows the insulator casing.

FIG. 14 shows the insulator casing 5, there being four pot-shaped protuberances 10 positioned on the bottom of the inside of the casing 5 to receive the springs 4 from FIG. 8. Four assembly aid elements 10 each are positioned on the front and rear sides of the casing 5, each corresponding to the assembly aid elements 11 for the insulator 1 from FIG. 13. On the short sides of the casing 5 there is one assembly aid element 10 each, which fix the insulators 1 in position elastically.

Figure 15:
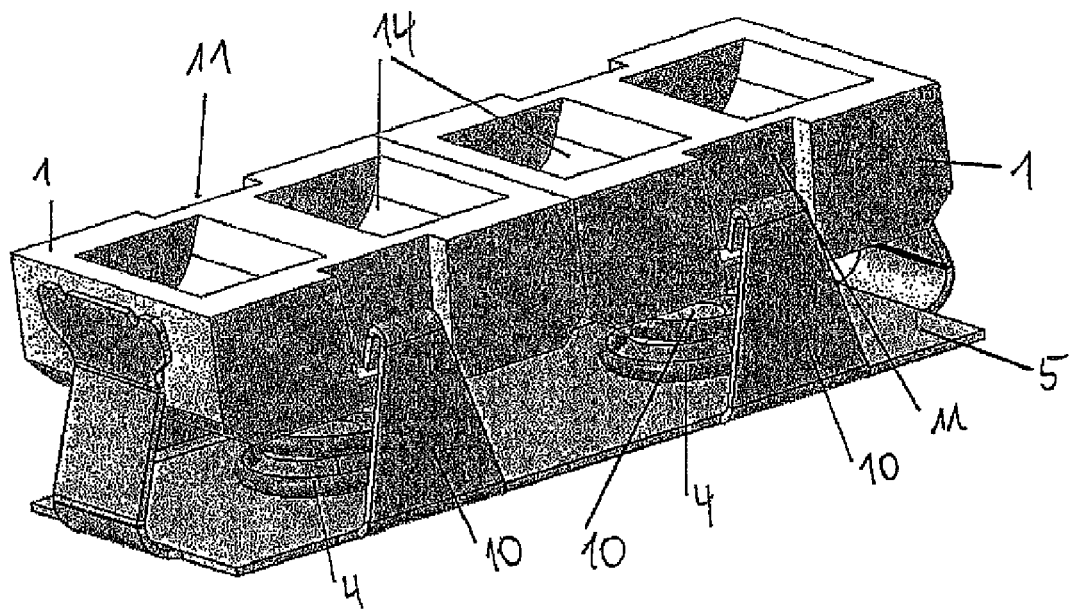
FIGS. 15-18 show a non-conducting insulator.

FIG. 15 shows two non-conducting insulators 1, which have one assembly aid element 11 each on their front sides. On their rear sides there is also one assembly aid element 11 each. Two more assembly aid elements 11 are positioned on the bottom sides of the insulators 1, and thus not visible here, which, however, is shown as a sectional drawing in FIG. 8. The spring 4 is positioned between the assembly aid element 10, which may be designed either in male or female fashion, and the assembly aid element 11. The assembly aid elements 11 correspond to the assembly aid elements 10 of the insulator casing 5. The insulator 1 has two retainers 14, which receive the meander turning points 6 of the ohmic conductor 2, as shown in FIGS. 2, 4 and 8.

Figure 16:
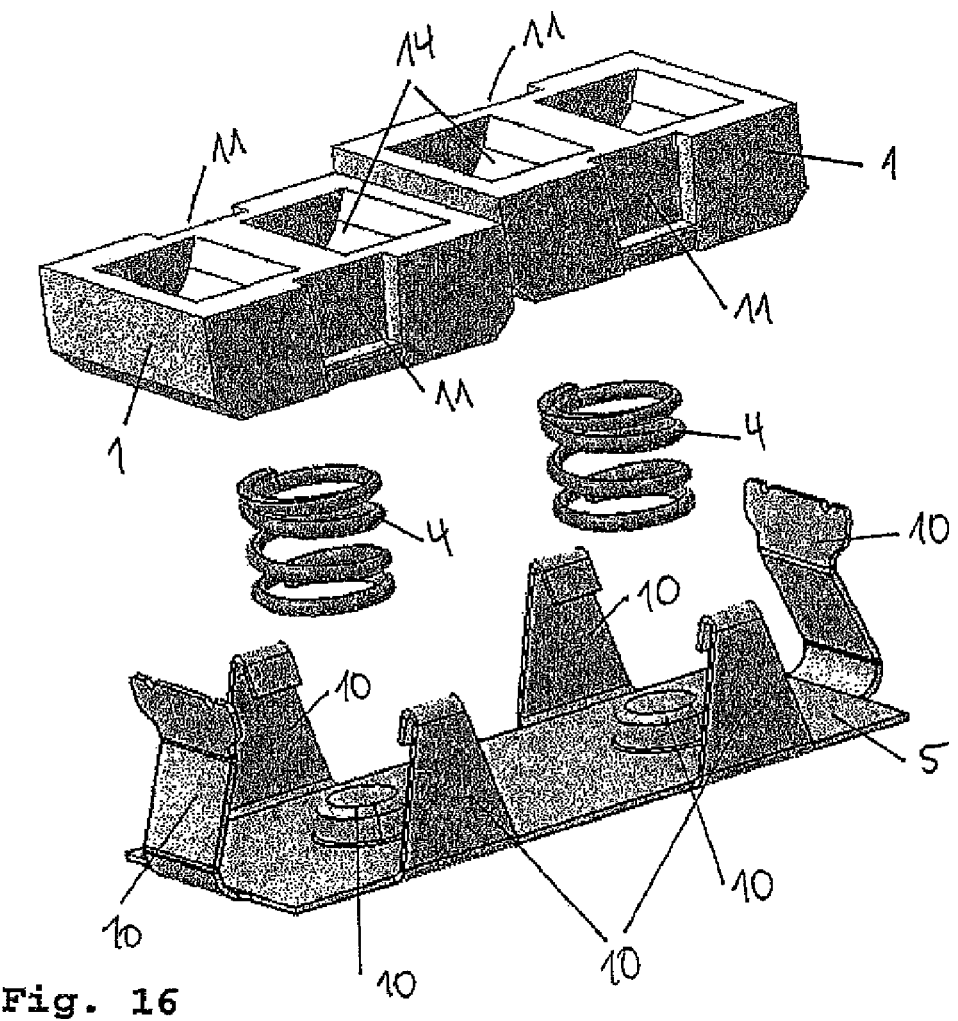

In FIG. 16 two non-conducting insulators 1 are shown, which have one assembly aid element 11 each on their front sides. On their rear sides there is also one assembly aid element 11 each. Two more assembly aid elements 11 are positioned on the bottom sides of the insulators 1 and thus not visible here, which, however, is shown as a sectional drawing in FIG. 8. The spring 4 is positioned between assembly aid element 10 and assembly aid element 11. The assembly aid elements 11 correspond to the assembly aid elements 10 of the insulator casing 5. The insulator 1 has two retainers 14, which receive the meander turning points 6 of the ohmic conductor 2, as shown in FIGS. 2, 4 and 8.

Figure 17:
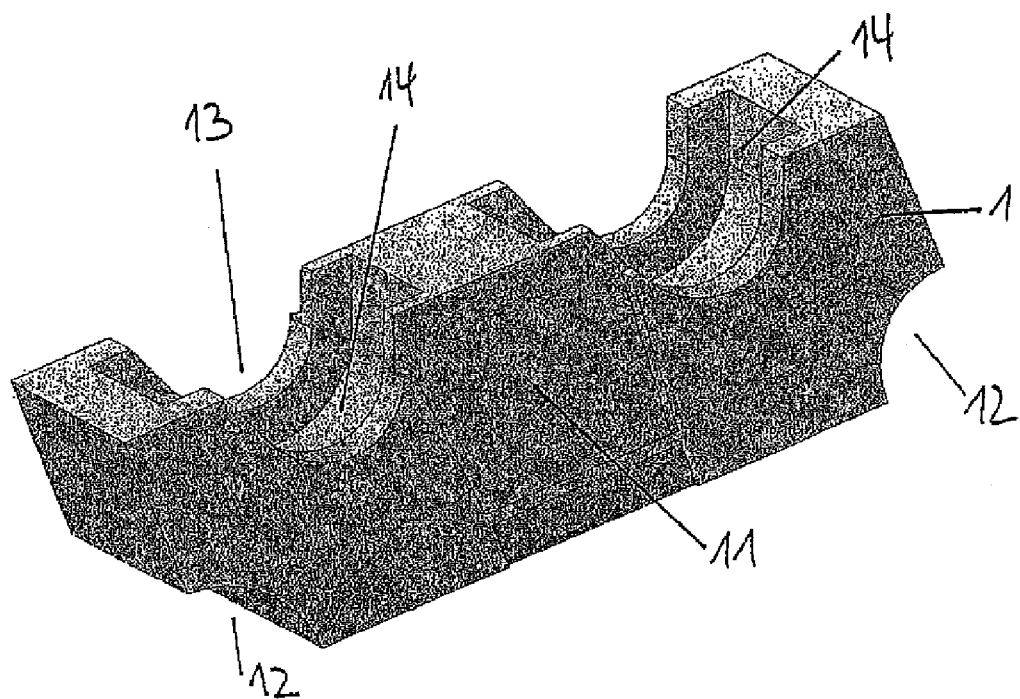

FIG. 17 shows a non-conducting insulator 1, which, has an assembly aid element 11 on its front side. On its rear side there is also an assembly aid element 11. The assembly aid elements 11 correspond to the assembly aid elements 10 of the insulator casing, as is shown in FIGS. 10 to 16. The insulator 1 has two retainers 14, which receive the meander turning points 6 of the ohmic conductor 2, as shown in FIGS. 2, 4 and 8. The insulator 1 has four recesses 13 for cooling the conductor 2 and two recesses 12 for cooling the springs 4.

FIG. 18 shows a non-conducting insulator 1, which, has an assembly aid element 11 on its front side. On its rear side there is also an assembly aid element 11. The assembly aid elements 11 correspond to the assembly aid elements 10 of the insulator casing, as is shown in FIGS. 10 to 16. The insulator 1 has two retainers 14, which receive the meander turning points 6 of the ohmic conductor 2, as shown in FIGS. 2, 4 and 8.

FIG. 19 shows a casing 5 made from a metal sheet, which has the assembly aid elements 10 (which have been punched from the same sheet) positioned to correspond to the complementary assembly aid elements of the insulator. In this embodiment a part of the respective side on the front and on the rear side of the casing 5 is bent inward approximately at a right angle so as to obtain an assembly aid element 10, which prevents any possible movement of the insulator toward the top side of the casing 5. Especially advantageous is the combined design of assembly aid element 10 and spring 4 in one element, realized in a single piece in the casing 5.

FIG. 20 shows a casing 5 made in one piece from sheet metal, which has the assembly aid elements 10 (which have been punched from the same sheet) positioned to correspond to the complementary assembly aid elements of the insulator. In this embodiment a part of the respective side on the front and on the rear side of the casing 5 is bent inward approximately at a right angle so as to obtain an assembly aid element 10, which prevents any possible movement of the insulator toward the top side of the casing 5. Especially advantageous is the combined design of assembly aid element 10 and spring 4 in one element, realized in a single piece in the casing 5.

Figure 21:
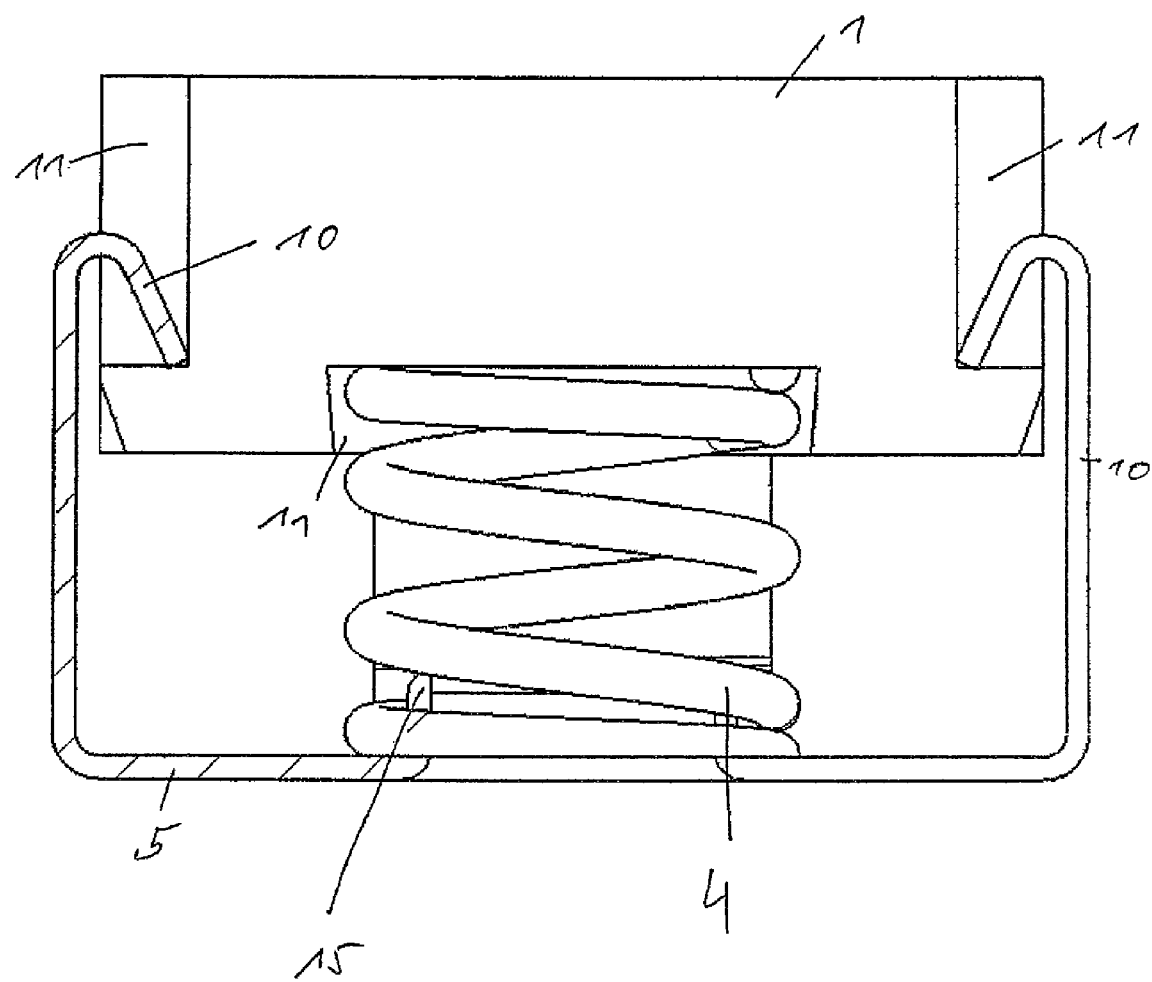
FIG. 21 shows a non-conducting insulator.

FIG. 21 shows a non-conducting insulator 1, which, has an assembly aid element 11 on its front side. On its rear side there is also an assembly aid element 11. Another assembly aid element 11 is positioned on the bottom sides of the insulators 1, which, for example, is shown as a sectional drawing in FIG. 8. The spring 4 is positioned between the dome 15, which is provided to centre the spring 4, and the assembly aid element 11. The dome 15 is crimped so that the spring 4 can be fixed in position for better assembly. The assembly aid elements 11 correspond to the assembly aid elements 10 of the insulator casing 5. The assembly aid elements 10 act as spring-action clips, which fix the insulator 1 in position such that it is pretensioned in spring-loaded fashion, after they had to execute a sideward movement outward during the assembly of the insulator 1 from the top, to then click into position in assembly aid elements 11, as shown in FIG. 21. The insulator 1 has retainers 14, which are not explicitly portrayed here and which receive the meander turning points 6 of the ohmic conductor 2, as shown in FIGS. 2, 4 and 8.

Figure 22:
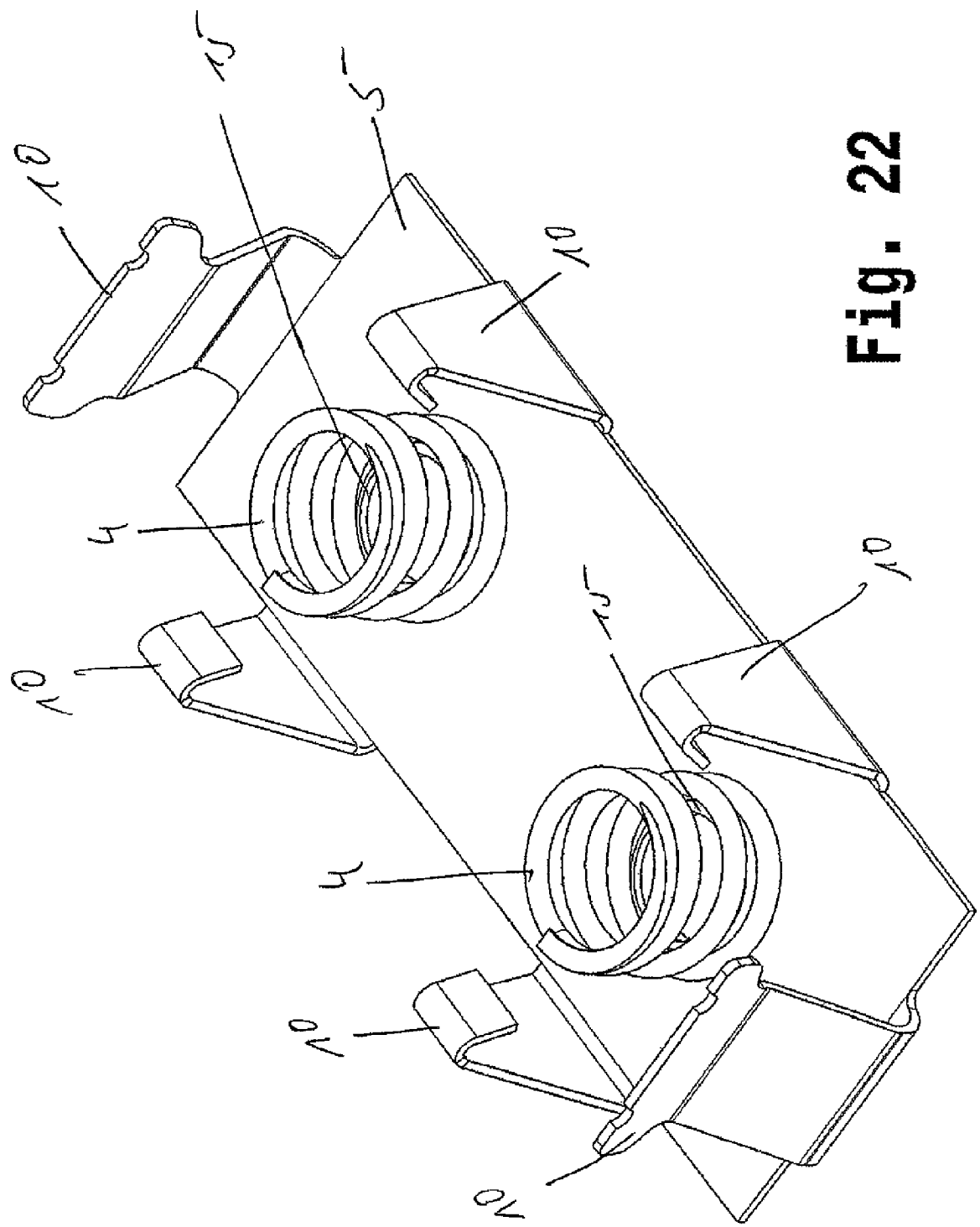
FIG. 22 shows a top view of the device according to FIG. 21.

FIG. 22 shows a top view of the device according to FIG. 21 without the non-conducting insulator 1. The assembly aid elements 10 are visible on the insulator casing 5, which has two crimped domes 15 on its bottom side, which both centre and fix the springs 4 in position during assembly.

List of Reference Symbols
   1 Non-conducting insulator
   2 Ohmic resistor
   3 Casing
   4 Elastic element
   5 Insulator casing
   6 Meander turning point
   7 Radius
   8 Direction indication for compressing during assembly
   9 Pretension force
   10 Assembly aid element, insulator casing
   11 Assembly aid element, insulator
   12 Recess
   13 Recess
   14 Retainer
   15 Dome for centering spring

What is claimed is:

1. Device for creating a temperature gradient, comprising at least one ohmic resistor arranged in meander shape, at least two non-conducting insulators wherein the non-conducting insulator has elements for accommodating the meander turning points of the ohmic resistor, at least one casing and at least one elastic element positioned between the non-conducting insulator and the casing, wherein the elements for accommodating the meander turning points are essentially angularly arranged.

2. Device according to claim 1 wherein the elastic element is designed as a leaf spring and/or as a coil spring and/or as a disk spring and/or as a flat coil spring and/or as a diaphragm spring and/or as an air-pressure or gas-pressure spring.

3. Device according to claim 1, wherein the ohmic resistor is designed in spring-elastic fashion.

4. Device according to claim 1, wherein the insulator has at least one insulator casing.

5. Device according to claim 4, wherein the insulator casing has at least one assembly aid element.

6. Method for manufacturing and/or assembling devices for creating a temperature gradient characterized in that a device is used in accordance with claim 1.

7. Device for creating a temperature gradient, comprising at least one ohmic resistor arranged in meander shape, at least two-conducting insulators wherein the non-conducting insulator has elements for receiving the meander turning points of the ohmic resistor, at least one casing and at least one elastic element positioned between the non-conducting insulator and the casing, wherein the elements for receiving the meander turning points comprise a retainer having two slants, which form an angle γ, which the angle γ is within a range of 30° and 90°.

* * * * *

UNITED STATES PATENT AND TRADEMARK OFFICE
CERTIFICATE OF CORRECTION

PATENT NO. : 8,405,007 B2
APPLICATION NO. : 12/448985
DATED : March 26, 2013
INVENTOR(S) : Martin Eller et al.

It is certified that error appears in the above-identified patent and that said Letters Patent is hereby corrected as shown below:

In the Claims

Column 6, line 8, cancel the text beginning with "1. Device for creating" to and ending "arranged." in column 6, line 16, and insert the following claim:

--1. Device for creating a temperature gradient, comprising at least one ohmic resistor arranged in meander shape, at least two non-conducting insulators wherein the two non-conducting insulators has elements for accommodating the meander turning points of the ohmic resistor, at least one casing and at least one elastic element positioned between the two non-conducting insulators and the casing, wherein the elements for accommodating the meander turning points are essentially angularly arranged, and the elements for accommodating the meander turning points comprise two slants which form an angle of 30° to 90°.--

Signed and Sealed this
Fourth Day of June, 2013

Teresa Stanek Rea
*Acting Director of the United States Patent and Trademark Office*